Jan. 12, 1965 C. W. LYLE 3,165,041
CODED SHUTTER SEQUENCE
Filed March 30, 1962 2 Sheets-Sheet 1
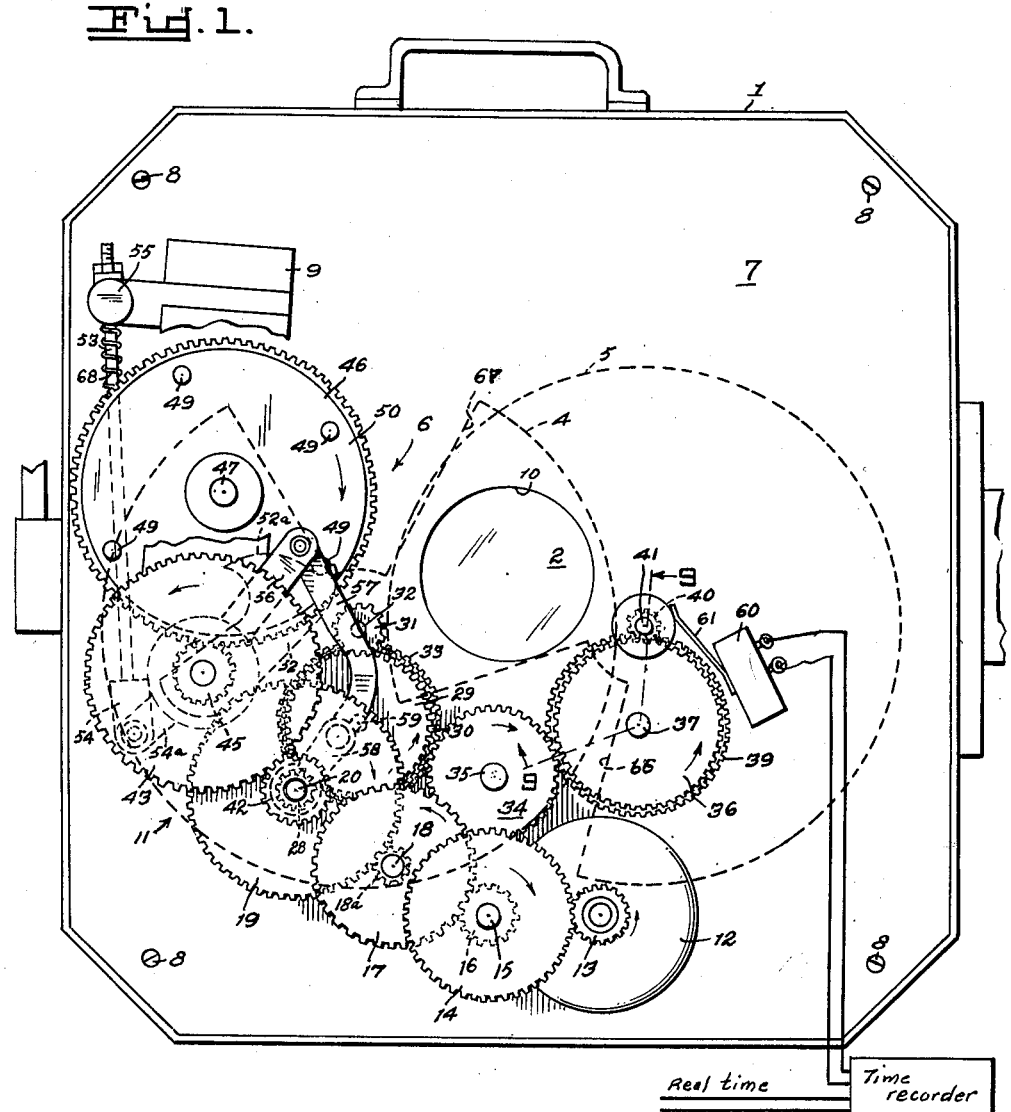
INVENTOR.
Charles W. Lyle
BY
S. J. Rotondi & A. J. Dupont Jan. 12, 1965     C. W. LYLE     3,165,041
CODED SHUTTER SEQUENCE
Filed March 30, 1962     2 Sheets-Sheet 2
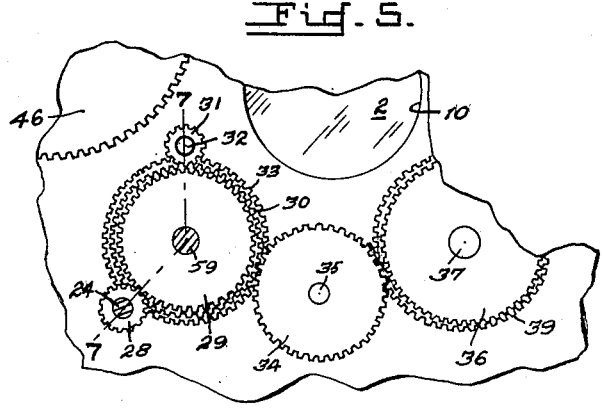
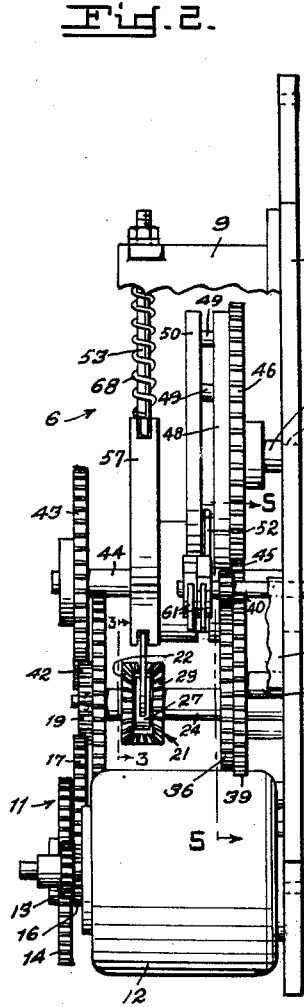
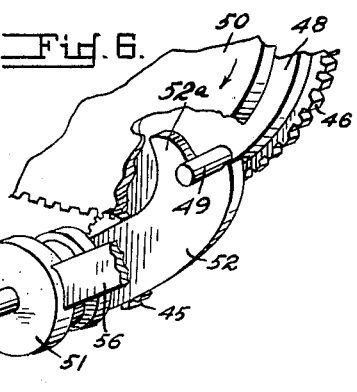
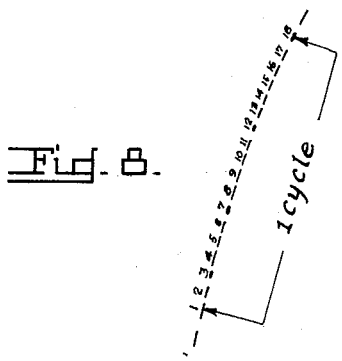
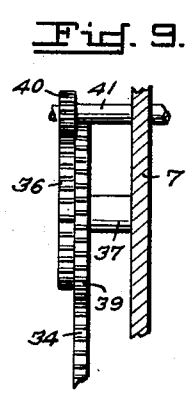
INVENTOR.
Charles W. Lyle
BY
S. J. Rotondi & A. J. Dupont

United States Patent Office 3,165,041
Patented Jan. 12, 1965

3,165,041
CODED SHUTTER SEQUENCE
Charles W. Lyle, Havre de Grace, Md., assignor to the United States of America as represented by the Secretary of the Army
Filed Mar. 30, 1962, Ser. No. 183,981
2 Claims. (Cl. 95—36)
(Granted under Title 35, U.S. Code (1952), sec. 266)

The invention described herein may be manufactured and used by or for the Government for governmental purposes without the payment to me of any royalty thereon.

This invention relates to a coded sequence shutter and more particularly to interrupting the regular cycle of a sequence camera shutter so that an identifiable pattern exists in the trail of images formed on the camera film when either the camera or object is moving.

Sequence exposures on the same plate or film producing a series of images have been made by various means and for various purposes. However, the problem remained to produce images that were identifiable and the present invention has accomplished this objective.

The purpose of putting a pattern in a trail of images is for identification of the image in relation to both time and space. It is possible to identify the time of an image in a normal, uninterrupted sequence of images by counting from the first image to the image to be identified and using a corresponding time recording. There are, however, many disadvantages to such a system. If, for example, the images are very faint, one or more of these images might be overlooked and not counted. Another example would be the slowing of the motion of the object or camera to the extent that the images could be superimposed, again creating a difficulty in accurately counting the images.

The present invention embodies the grouping of the images in a sequence on a photographic film, or plate, into patterns based on time so as to provide a definite and easily recognizable relation between a particular image and the time during which the image was formed.

This is accomplished by a conventional camera having rotating shutters which are connected through a gear train to a synchronous motor, the shutters rotating at one revolution per second. There is a differential in the gear train which can, when operated, be used to slow down or speed up the shutter. A cam device automatically operates the differential and is driven by the synchronous motor.

It is a primary object of the invention to establish an identifiable pattern in the trail of images formed on the film of a camera when either the camera or object photographed is moving.

Another object of the invention is to produce an identifiable pattern on the film of a sequence camera by interrupting its regular cycle.

Still another object is to accomplish the interrupting of a shutter rotation of a camera by a gear train having a differential which is operated by a cam to slow down or speed up the shutter rotation.

The specific nature as well as other objects and advantages thereof, will clearly appear from a description of a preferred embodiment as shown in the accompanying drawing in which:

FIGURE 1 is a front view of a camera and of the gear train and cam arrangement for interrupting the rotation of the shutter;

FIGURE 2 is a side view of the device shown in FIGURE 1, the camera being left out for sake of clarity;

FIGURE 3 is an enlarged detail section taken along line 3—3 of FIGURE 2 and illustrating the differential;

FIGURE 4 is a side view of the differential;

FIGURE 5 is a detail section taken along line 5—5 of FIGURE 2;

FIGURE 6 is a perspective detail of the cam arrangement;

FIGURE 7 is a detail section taken along line 7—7 of FIGURE 5;

FIGURE 8 is a diagram showing the result in slowing down and speeding up of the shutters of the camera when photographing an image trail;

FIGURE 9 is a detail section taken along line 9—9 of FIGURE 1; and,

FIGURE 10 is a detail perspective view illustrating the wipers of the electric switch.

Referring now to the drawings, reference character 1 indicates generally a camera having a pair of object lenses 2 and 3 (FIG. 2) and rotating shutters 4 and 5.

The operating elements of the coded shutter sequence of the invention are indicated generally by 6 and are mounted on a plate 7 which is mounted on the front of camera 1 by screws 8.

A suitable supporting structure is provided in spaced relation to plate 7 for additional support of the operative elements, a portion of which is shown as at 9 in FIGS. 1 and 2.

Plate 7 is provided with a central aperture 10 in alignment with lens 2 and 3 to provide a light path for the photographing of an object.

Mechanism for operating the coded sequence shutter comprises gear trains, differential and cam mechanism indicated generally by 11.

Shutters 4 and 5 are rotated one revolution per second through gear train 11 by an electric motor 12 which is supported by plate 7.

Gear train 11 consist of a gear 13 on motor 12 which drives a gear 14 on shaft 15. Gear 16 on shaft 15 meshes with a gear 17 on a shaft 18. Gear 18a on shaft 18 meshes with a gear 19 on a shaft 20. A differential indicated generally by 21 consists of a driving beveled gear 22 on shaft 20, a beveled driven gear 23 on a shaft 24 which is axially aligned with shaft 20 and is journaled in plate 7, and idler beveled gears 25, 26 and 38 journaled in a collar 27 which is rotatably mounted between shafts 20 and 24 and mesh with beveled gears 22 and 23.

Mounted on a shaft 24 (see FIG. 7) near plate 7 is a gear 28 which meshes with a gear 29 of a three idler gear cluster which is mounted on a shaft 59. A second gear 30 mounted on shaft 59 of the cluster meshes with a gear 31 on a shaft 32 and which drives shutter 4 of the camera 1. A third gear 33 of the cluster drives an idler gear 34 on a shaft 35 which meshes with a first gear 39 of a two-gear cluster on a shaft 37. A second gear 36 of the two-gear cluster meshes with a gear 40, on a shaft 41, which drives shutter 5 of camera 1.

Means for interrupting the rotation of shutter 4 and 5 are provided and consist of a gear 42, mounted on shaft 20, which meshes with a gear 43 on shaft 44.

A gear 45 is mounted on shaft 44 and meshes with a cam gear 46 on a shaft 47 journaled in plate 7. A cam assembly is mounted on cam gear 46 and comprises a plate 48 fixed to gear 46 in which studs 49 are fixed and are supported at one of their ends in plate 48 and another spaced plate 50, also fixed to gear 46 by the studs 49.

A collar 51 is rotatably mounted on shaft 44 and carries an arm 52 rigidly fixed thereto and defining a cam follower 52a at its outer end which engages studs 49.

Cam arm 52 is biased in an upward direction by rod 53 connected by a knuckle 54 which is pivoted to an extension 54a extending from collar 51.

Rod 53 is pivoted as at 55 to support 9 and a coil spring 68 encircling rod 53 biases collar 51 in a counter clockwise direction on shaft 44.

A link 56 integral with collar 51 is pivotally connected to a link 57. Link 57 is pivotally connected to a differential arm 58 integral with collar 27.

All shafts upon which the gears and collars are secured are mounted on plate 7 or other supporting structure such as brackets (not shown) etc., and are left out of the drawings for the sake of clarity.

An electric switch indicated generally by 60 is secured to plate 7. Switch 60 has two brushes 61 and 62 which wipe on a rotor 63 mounted on shaft 47. Rotor 63 is made of an insulating material and has metal ring 65 having a tab 64 which close a circuit through the brushes.

Switch 60 is a means to record the time of the opening of the shutter on an electric time recording device 61 such as a magnetic tape recorder or other recording device shown schematically by block 61.

Shutter 4 and 5 are provided with open areas 66 and 67 for exposure upon a film (not shown) in camera 1.

*Operation*

The motor 12, through gear train 11 drives gear 19 at one revolution per second. Gear 19, through differential 21 drives gear 28 at the same rate.

Gear 28 drives three-gear cluster 29, 30, and 33 through gear 29. Gear 30 of the cluster drives gear 31 which rotates disc 4 through shaft 32.

Gear 33 of the three-gear cluster drives idler gear 34 which drives gear cluster 36 and 39 through gear 39 while gear 36 drives gear 40 on shaft 41 which rotates shutter 5.

The ratios of the various drives are such that both shutters revolve at one r.p.s. (the same as gear 28) as long as the differential 21 is unmoved.

Moving the differential arm 58 to the right retards the speed of gear 28 and consequently that of the two shutters 4 and 5. Similarly, movement of the arm 58 to the left increases the speed of the shutters.

Movement of the arm 58 is accomplished by the action of cam arm 52 and follower 52a. Follower 52a is held in contact with studs 49, on plates 50 and 48 which are rigidly attached to gear 46, by spring biased rod 53 and through link 57 which moves arm 58.

Gear 46 moving in a clockwise direction moves studs 49 against cam follower 52a to move arm 52, link 57 and arm 58 in a clockwise direction, after follower 52a rides under its engaging stud, spring biased rod returns arm 58 to its original position.

The four studs 49 carried by plates 50 and 48, rotate once every eighteen seconds in a clockwise direction.

As gear 42 is rigidly fixed to gear 19, it follows that the four studs 49 decrease and increase shutter speed four times in every eighteen revolutions of the shutters 4 and 5. The openings 66 and 67 in shutters 4 and 5 respectively, are so placed in their relation to the action of studs 49 that slowing of the shutters 4 and 5 increases the time they remain closed, and the following increase of speed shortens the time they remain open.

Consequently, in every series of eighteen exposures, four of the exposures will be of shorter duration than the other fourteen exposures (see FIG. 8), and four of the intervals between the eighteen exposures will be longer than the other fourteen intervals.

By virtue of the switch 60, operated by the rotor 63 fixed to one of the shutter shafts, a corresponding series of fourteen short intervals and four longer intervals between recordings will appear on the record of the time recording device 61. On this same record real time will be recorded by means of the United States Bureau of Standards radio time signals or any other means of recording real time.

The time of any identifiable image in any series of eighteen exposures will be identified on the timing record by means of comparing its position in the space pattern on the film, with a time recording having the same position in the time record pattern.

Since a recording of real time appears adjacent to the recording of the time of the images, the real time of any identifiable image will be apparent.

Variations and modifications may be effected without departing from the scope of the novel concept of the present invention as set forth in the appended claims.

What is claimed is:

1. In combination with a camera having an object lens and a pair of apertured, rotatable shutters overlapping said lens; a coded sequence mechanism for intermittently interrupting the rotational speed of said shutters comprising, a driving motor, gearing including a cam gear driven by said motor and synchronously rotating said shutters; a differential in said gearing and a cam mechanism cooperating with said cam gear and connected to said differential, said cam mechanism comprising a series of studs mounted on the outer face of said cam gear, a collar rotatably mounted below said cam gear, an arm rigidly carried by said collar, said arm having a cam surface at its outer end and in contact with said arm, linkage connecting said last named collar with the collar on said differential, an extension on the collar of said cam mechanism and a spring loaded rod connected to said extension normally urging said last named collar in a counter clockwise direction, said arm on said last named collar being moved in a clockwise direction upon contact of a said stud on said cam gear whereby said linkage moves said last named collar on said differential in a clockwise direction to slow down the speed of rotation of said gearing.

2. In combination with a camera including a supporting structure, an object lens in said structure, a pair of driven shafts journaled in said structure and an aperture shutter carried by each shaft for rotation therewith, said shutters overlapping said lens; a coded sequence mechanism carried by said supporting structure for interrupting the rotational speed of said shutter comprising, a driving means, a gearing driven by said driving means for synchronously rotating the shutters, a differential in said gearing and a cam mechanism in said gearing, said cam mechanism being operated by said gearing and connected to said differential whereby upon actuation of said cam mechanism by said gearing the rotational speed of said shutters will be interrupted upon exposure of said lens thereby; and means for recording the time of exposure of said lens by said shutters comprising, an insulated rotor mounted on a said shaft, a metal ring encircling a portion of said rotor, said ring having a tab integral therewith and extending across the exposed portion of said rotor, an electric switch fixed to said structure and having a pair of brushes, one brush wiping said ring and the other wiping the exposed portion of said rotor whereby said switch will be alternately opened and closed upon rotation of said rotor and a time recorder for recording the interruption of said shutter speed, said recorder being electrically connected to said switch.

References Cited by the Examiner

UNITED STATES PATENTS

| | | | |
|---|---|---|---|
| 1,836,224 | 12/31 | Burkhardt | 88—19.3 |
| 2,420,339 | 5/47 | Rabinow | 95—36 |
| 2,460,163 | 1/49 | Bowen | 95—36 |
| 2,858,750 | 11/58 | Farinet | 88—19.3 X |

NORTON ANSHER, *Primary Examiner.*

JOHN M. HORAN, *Examiner.*